(12) United States Patent (10) Patent No.: US 8,494,028 B1
Charlesworth (45) Date of Patent: Jul. 23, 2013

(54) DESPREADING METHODS AND APPARATUS

(75) Inventor: Oliver Charlesworth, Cambridge (GB)

(73) Assignee: Spidercloud Wireless Inc, Santa Clara, CA (US)

( * ) Notice: Subject to any disclaimer, the term of this patent is extended or adjusted under 35 U.S.C. 154(b) by 711 days.

(21) Appl. No.: 12/609,975

(22) Filed: Oct. 30, 2009

Related U.S. Application Data

(60) Provisional application No. 61/110,528, filed on Oct. 31, 2008.

(51) Int. Cl.
*H04B 1/00* (2006.01)

(52) U.S. Cl.
USPC .......................................... 375/147; 375/130

(58) Field of Classification Search
USPC ........................................................ 375/147
See application file for complete search history.

(56) References Cited

U.S. PATENT DOCUMENTS

2003/0202499 A1* 10/2003 Thron et al. .................. 370/342

2007/0064590 A1* 3/2007 Prokop et al. ................. 370/208

* cited by examiner

*Primary Examiner* — Kenneth Lam
*Assistant Examiner* — Michael Neff

(57) ABSTRACT

Despreading apparatus with a relatively simple control is described. Plurality of despreading modules are provided in parallel, e.g., one per user. Each despreading module supports a plurality of despreading rates, e.g., ranging from the minimum to the maximum despreading rate that may be assigned to a user. Each despreading module is controlled in a simple manner with the output of the despreading module and despreading rate achieved being determined by a control module controlling a controllable downsampling module such that despreading rate corresponding to the individual user to which the despreading module corresponds is achieved at any given time. MUX control signals are provided to a plurality of MUXes included in the despreading module, and may be stored in a table with each set of MUX control signals corresponding to a different despreading rate. Control is greatly simplified, compared to systems where a set of despreading circuitry is dynamically configured.

10 Claims, 4 Drawing Sheets

DESPREADING METHODS AND APPARATUS

RELATED APPLICATION

This application claims the benefit of the filing date of U.S. Provisional Application No., 61/110,528 filed on Oct. 31, 2008, and entitled "DESPREADING METHODS AND APPARATUS" and which is hereby expressly incorporated by reference in its entirety.

FIELD

The present application is directed to communications methods and apparatus and, more particularly, to method and apparatus for performing despreading.

BACKGROUND

In various communications systems, e.g., some CDMA systems, different users may use different uplink transmission rates. For a base station to recover a signal corresponding to an individual user, the appropriate level of despreading should be applied, e.g., an amount of despreading corresponding to the data rate of the users uplink channel.

A base station normally needs to be able to support communications with a number of users at the same time. As a result, a base station normally has to be able to perform different amounts of despreading for different users.

In many cases, the base station needs to be able to address the possibility that any one of the users may operate at the highest possible uplink rate.

While despreading may be done by simply configuring together, e.g., under software control, the minimum number of elements needed to implement despreading for an individual user based on the user's data rate, the ability to support such dynamic configuration adds complexity. Thus, while in such a dynamic implementation intended to minimize the number of hardware elements the number of elements used to perform despreading operations may be decreased as compared to some other embodiments, the level of control complexity associated with supporting such a dynamic level of configuration adds considerable complexity to controlling and configuring the device. Furthermore, given that device, e.g., base station, may need to be able to support high despreading rates for multiple users at the same time, such dynamic configuration may actually result in little hardware savings since many despreading elements which are required to enable support of high despreading rates are likely to go unused when users requiring low despreading rates are being supported.

In view of the above, it should be appreciated that it would be desirable if methods and/or apparatus could be developed which would allow for relatively simple control and little or no need to reconfigure hardware modules to support multiple despreading rates for multiple users.

SUMMARY

A plurality of despreading modules are provided in parallel, e.g., one per user. Each despreading module supports a plurality of despreading rates, e.g., ranging from the minimum to the maximum despreading rate that may be assigned to a user. Each despreading module is controlled in a relatively simple manner with the output of the despreading module and despreading rate achieved being determined by a control module controlling a controllable downsampling module such that despreading rate corresponding to the individual user to which the despreading module corresponds is achieved at any given time. Included in a despreading module is a plurality of multiplexers (MUXes) and the output of each MUX is controlled by the control module that provides MUX control signals. The MUX control signals may be stored in a table with each set of MUX control signals corresponding to a different despreading rate. In this manner, control is greatly simplified and can be implemented in a straight forward manner as compared to systems where a set of despreading circuitry is dynamically configured using a minimum number of despreading elements. In various embodiments, the despreading modules are normally implemented in hardware, e.g., with a base station including N despreading modules which can be used in parallel. N may correspond to, for example, a number of users which can use an uplink to the base station in parallel.

While some despreading elements may go unused when a user corresponding to the despreading module uses a low despreading rate, the simplified control and lack of a need to dynamically configure hardware modules offers design advantages over other approaches which require more complicated despreading control mechanisms.

DETAILED DESCRIPTION

Figure 1:
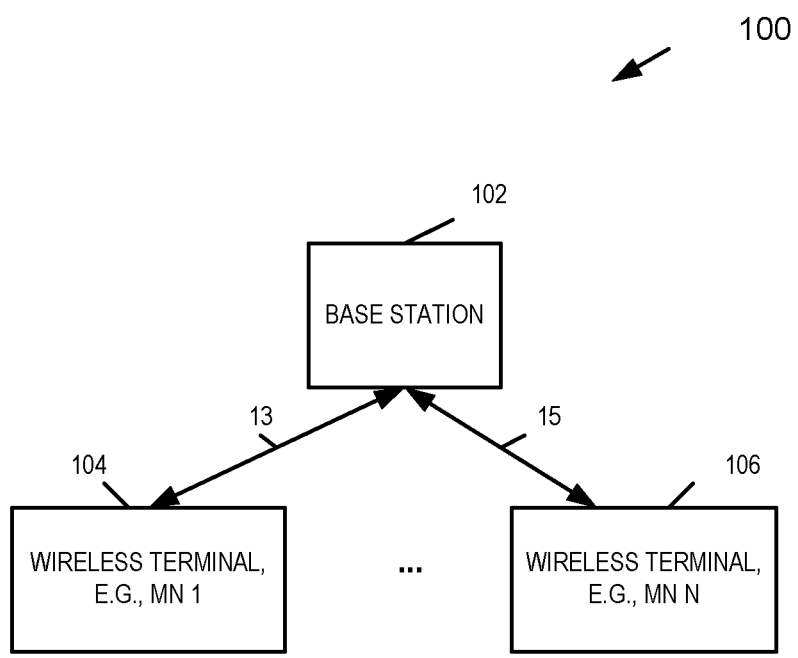
FIG. 1 illustrates an exemplary communication system implemented in accordance with one embodiment of the invention.

FIG. 1 illustrates a communications system 100 implemented in accordance with one exemplary embodiment of the invention. In the system 100, multiple wireless terminals, e.g., mobile nodes MN 1 (104) through MN N (106) each corresponding to a different user communicate with a base station 102, e.g., a femtocell, through the use of communication signals 13, 15. The base station 102 may be implemented and perform despreading for the different users, e.g., for uplink signals from the different mobile nodes, in accordance with the invention. While shown as exemplary mobile nodes, the wireless terminal may also include stationary devices. Each mobile terminal may correspond to a different mobile user and are therefore sometimes referred to as user terminals. The signals 13, 15 may be, e.g., CDMA or OFDM signals. Thus, signals 13, 15 include uplink signals from the different mobile nodes.

Figure 2:
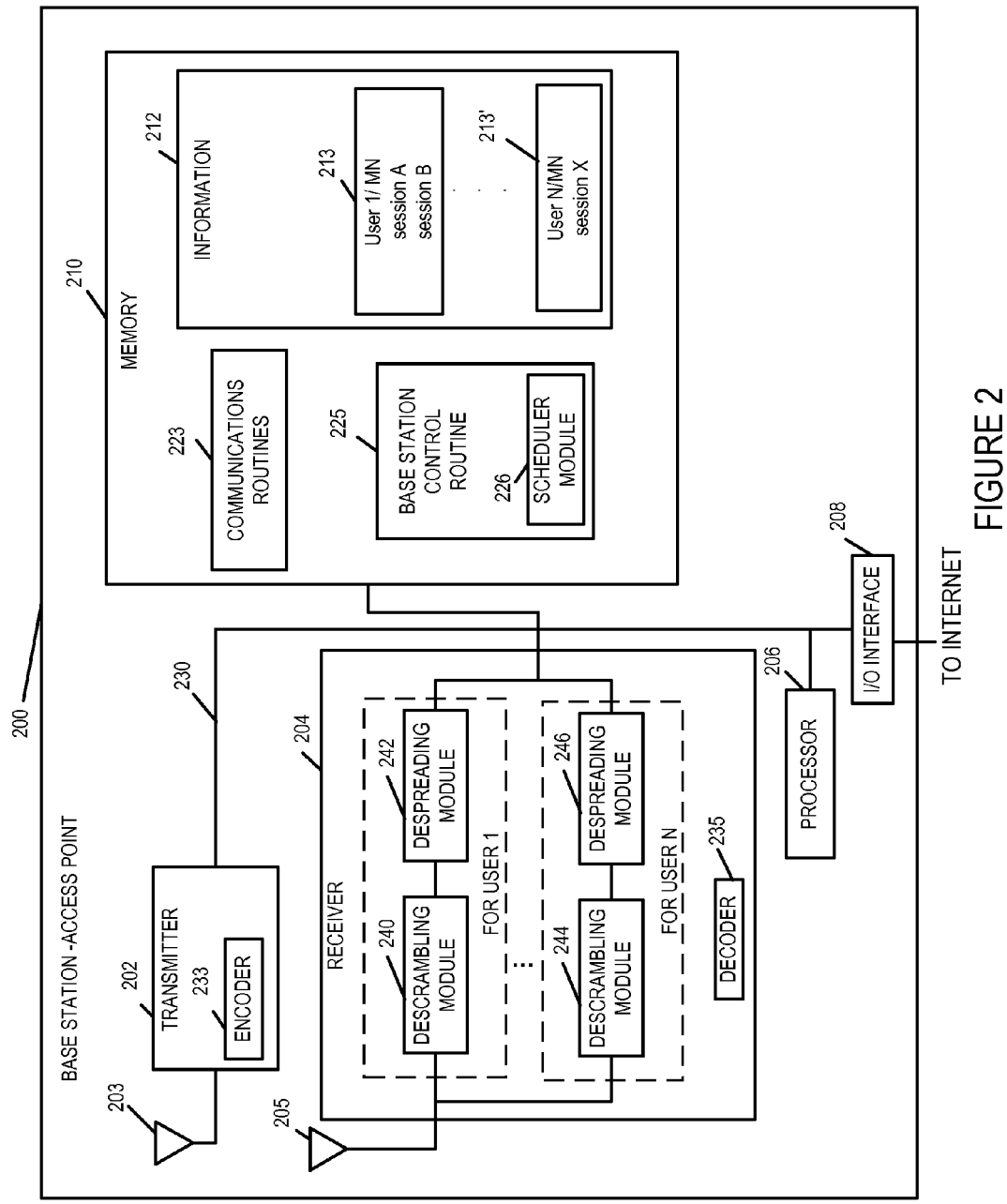
FIG. 2 illustrates an exemplary base station, e.g., access point, implemented in accordance with the invention.

FIG. 2 illustrates an exemplary base station 200 which may be, e.g., an access router, implemented in accordance with the invention. In some embodiments the base station 200 can be used as, e.g., femtocell 102 of system 100. The base station 200 includes antennas 203, 205 and transmitter receiver circuitry 202, 204. The transmitter circuitry 202 includes an encoder 233 while the receiver circuitry 204 includes a decoder 235. The receiver circuitry 204 further includes a plurality of receiver processing chains, e.g., one per uplink user. Each user processing chain may be used for recovering the signals corresponding to different mobile node and includes a descrambling module and a despreading module. Thus, uplink descrambling and despreading are performed on a per user basis with one processing chain being provided for each user, e.g., user 1, user 2, . . . , user N. As shown, the receiver processing chain corresponding to user 1 includes a descrambling module 240 and despreading module 242 for user 1. Similarly, the receiver processing chain corresponding to user N includes a descrambling module 244 and despreading module 246 for user N. As will be discussed below, each of the despreading modules 242, 246 may be implemented using a despreading module in accordance with the invention such as the exemplary despreading module shown in FIG. 3. The output of the despreading modules may be processed by the decoder 235. The transmitter and receiver circuitry 202, 204 is coupled by a bus 230 to an I/O interface 208, processor (e.g., CPU) 206 and memory 210. The I/O interface 208 couples the base station 200 to the internet and/or an IP network. The memory 210 includes routines, which when executed by the processor 206, cause the base station 200 to operate in accordance with the invention. Memory includes communications routines 223 used for controlling the base station 200 to perform various communications operations and implement various communications protocols. The memory 210 also includes a base station/femtocell control routine 225 used to control the base station 200 to implement the steps of the method of the present invention described above. The base station control routine 225 includes a scheduler module 226 used to control transmission scheduling and/or communication resource allocation. Thus, module 226 may serve as a scheduler. Memory 210 also includes information used by communications routines 223, and control routine 225. The information 212 includes an entry for each active mobile station user 213, 213' which lists the active sessions being conducted by the user and includes information identifying the mobile station (MN) being used by a user to conduct the sessions.

Figure 3:
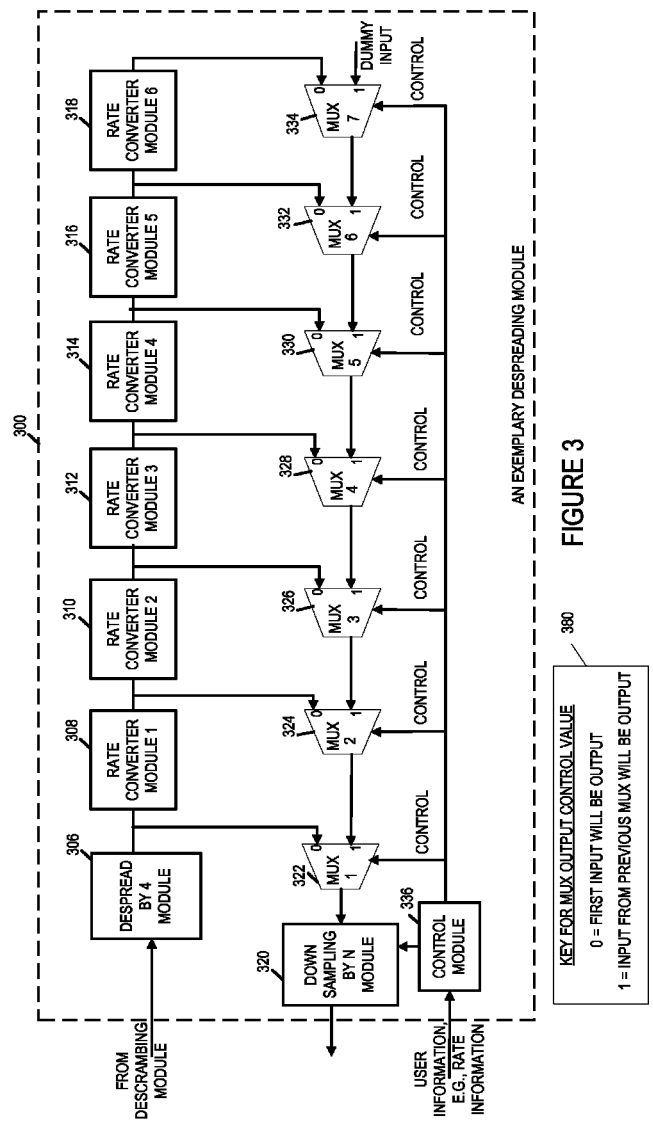
FIG. 3 illustrates an exemplary despreading module which can be used in the exemplary base station shown in FIGS. 1 and 2, in accordance with one aspect of the invention.

FIG. 3 illustrates an exemplary despreading module implemented in accordance with the invention. The elements in FIG. 3 are driven by a common clock. The despreading module 300 may be implemented in hardware with one such despreading module being provided for each of the N users supported by the base station 200. The despreading module 300 receives the output of the descrambling module corresponding to the user to which the despreading module corresponds. User information, e.g., a control signal indicating user data rate and/or amount of despreading to be performed is also supplied as an input to the despreading module.

The despreading module includes a despread by 4 module 306, followed by a series of rate converter modules 308, 310, 312, 314, 316, 318. Each of the rate converter modules represents an additional despreading stage. The output of each of the modules 306, 308, 310, 312, 314, 316, 318 servers as a first input to a corresponding MUX in the series of MUXes 322, 324, 326, 328, 330, 332, 334. The control module 336 controls the control signal input supplied to the individual MUXes. Each MUX outputs one of the two inputs, with the control signal determining which input is supplied to the output of the MUX at any given time. The output of the MUX 322 is supplied as an input to the downsampling by N module 320. Note that the lower input to MUX 334 corresponding to a control value of "1" is a dummy input, e.g., a don't care value. The control module 336 controls the downsampling module 320 as a function of the despreading rate to be achieved for the given user as indicated by the input to the control module 336. In addition, the control module 336 also provides control inputs to the MUXes 322 through 334. The MUX control signal pattern repeats every 256 periods and is independent of the output rate being achieved at a given point in time. A simple recurring control pattern for each of MUXes can be stored and used by the control module 336 to determine the control signals to be supplied to the MUXes at a given time making control relatively simple to implement. In one embodiment, the MUX control pattern used to control each individual MUX is of length 256 bits with each bit being a control value for a single chip period in a recurring sequence of 256 chip periods. An exemplary 256 bit control pattern is shown below for each of the MUXs 322 through 334.

MUX 1 322: 3 ones followed by a zero, repeated 64 times
MUX 2 324: 7 ones followed by a zero, repeated 32 times
MUX 3 326: 15 ones followed by a zero, repeated 16 times
MUX 4 328: 31 ones followed by a zero, repeated 8 times
MUX 5 330: 63 ones followed by a zero, repeated 4 times
MUX 6 332: 127 ones followed by a zero, repeated 2 times
MUX 7 334: 255 ones followed by a zero The control pattern is shown below, in terms of binary value representation.

MUX 1 322: 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110 1110

MUX 2 324: 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110 1111 1110

MUX 3 326: 1111 1111 1111 1110 1111 1111 1111 1110 1111 1111 1111 1110 1111 1111 1111 1110 1111 1111 1111 1110 1111 1111 1111 1110 1111 1111 1111 1110 1111 1111 1111 1110 1111 1111 1111 1110 1111 1111 1111 1110 1111 1111 1111 1110 1111 1111 1111 1110 1111 1111 1111 1110 1111 1111 1111 1110 1111 1111 1111 1110 1111 1111 1111 1110

MUX 4 328: 1111 1111 1111 1111 1111 1111 1111 1110 1111 1111 1111 1111 1111 1111 1111 1110 1111 1111 1111 1111 1111 1111 1111 1110 1111 1111 1111 1111 1111 1111 1111 1110 1111 1111 1111 1111 1111 1111 1111 1110 1111 1111 1111 1111 1111 1111 1111 1110 1111 1111 1111 1111 1111 1111 1111 1110 1111 1111 1111 1111 1111 1111 1111 1110

MUX 5 330: 1111 1111 1111 1111 1111 1111 1111 1111 1111 1111 1111 1111 1111 1111 1111 1110 1111 1111 1111 1111 1111 1111 1111 1111 1111 1111 1111 1111 1111 1111 1111 1110 1111 1111 1111 1111 1111 1111 1111 1111 1111 1111 1111 1111 1111 1111 1111 1110 1111 1111 1111 1111 1111 1111 1111 1111 1111 1111 1111 1111 1111 1111 1111 1110

MUX 6 332: 1111 1111 1111 1111 1111 1111 1111 1111 1111 1111 1111 1111 1111 1111 1111 1111 1111 1111 1111 1111 1111 1111 1111 1111 1111 1111 1111 1111 1111 1111 1111 1110 1111 1111 1111 1111 1111 1111 1111 1111 1111 1111 1111 1111 1111 1111 1111 1111 1111 1111 1111 1111 1111 1111 1111 1111 1111 1111 1111 1111 1111 1111 1111 1110

MUX 7 334: 1111 1111 1111 1111 1111 1111 1111 1111 1111 1111 1111 1111 1111 1111 1111 1111 1111 1111 1111 1111 1111 1111 1111 1111 1111 1111 1111 1111 1111 1111 1111 1111

1111 1111 1111 1111 1111 1111 1111 1111 1111 1111 1111
1111 1111 1111 1111 1111 1111 1111 1111 1111 1111 1111
1110

Consider for example that for the first chip of the 256 chip sequence, MUX 1 will receive a control input of 1, MUX 2 a control input of 1 and so on. During the fourth chip of the sequence, MUX 1 will receive a control input value of 0 and each of the other Muxes 2-7 will receive a control input of 1. Thus, for the 4th chip in the 256 bit sequence, the output of the first MUX 322 will correspond to the input of the despread by 4 module 306. The downsampling by N module 320 outputs one input value for each N chips. Thus, if the control module sets N to four, the downsampling by N module will output the input signal supplied to the downsampling by N module 320 corresponding to every fourth chip in the 256 chip sequence.

Table 1 shown below, in the second column, illustrates different values of N used by the down sampling by N module 320 of FIG. 3 to achieve a desired output rate in symbols per second with the output rate being shown in the first column. The values of N used by the down sampling by N module shown in Table 1 are used in one embodiment to achieve the corresponding target output rate shown in the first column. For example, if N is set by control module 336 to 4, an output rate of 960000 symbols per second is achieved with one value being output by the downsampling by N module every 4 chips. If N is set to 256 by the control module 336, the downsampling by N module 320 will output one value every 256 chips resulting in an output rate, in symbols per second, of 15000.

TABLE 1

| Output Rate (symbols per second) | Value of N used by down-sampler |
|---|---|
| 960000 | 4 |
| 480000 | 8 |
| 240000 | 16 |
| 120000 | 32 |
| 60000 | 64 |
| 30000 | 128 |
| 15000 | 256 |

Figure 4:
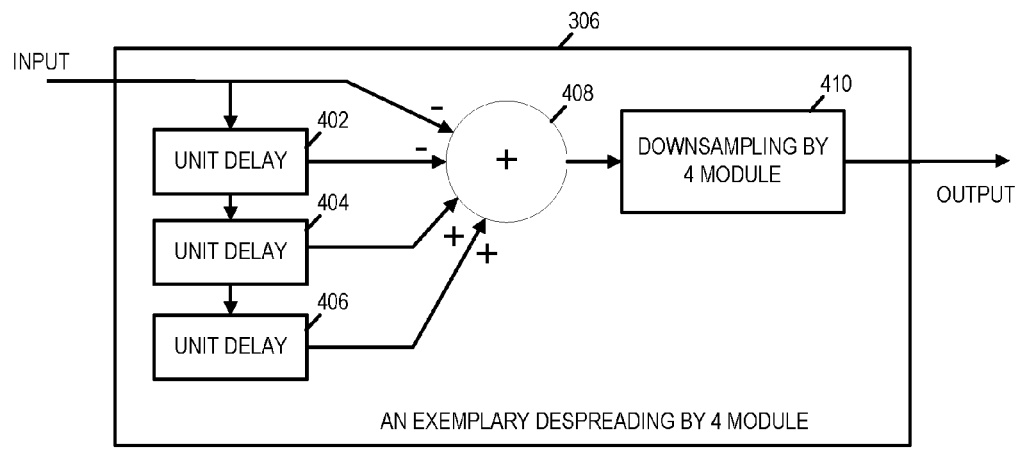
FIG. 4 illustrates an exemplary despreading by 4 module, implemented in accordance with one embodiment of the invention.

FIG. 4 illustrates an exemplary despreading by 4 module which may be used as the despreading by 4 module 306 shown in FIG. 3. As illustrated, the despreading by 4 module 306 includes first, second and third unit delays 402, 404, 406 coupled to a summer 408 as shown in FIG. 4. The output of the summer 408 is supplied to a down sampling by 4 module 410 which generates the output of the module 306.

Figure 5:
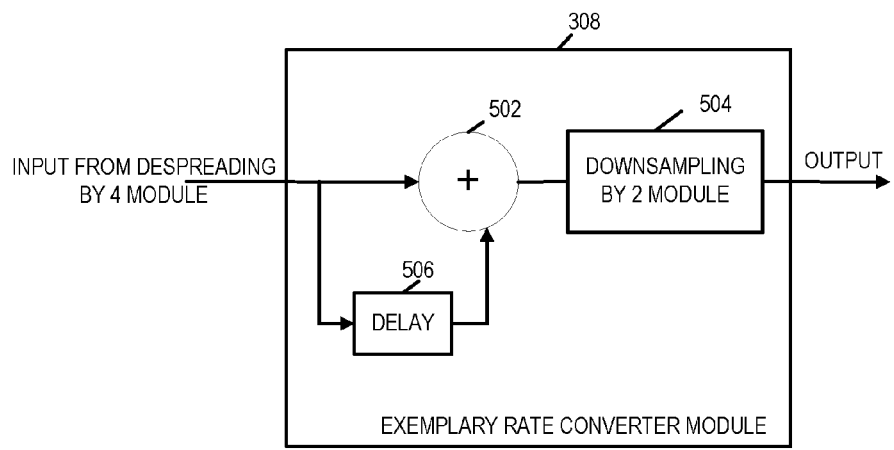
FIG. 5 illustrates an exemplary rate converter module, implemented in accordance with one embodiment of the invention.

FIG. 5 illustrates an exemplary a rate converter module which may be used as any one of the rate converter modules 308 through 318 shown in FIG. 3. For purposes of explanation it is assumed that the rate converter module shown in FIG. 5 corresponds to rate converter module 1 308 of FIG. 3 and thus the input is illustrated as being from the despreading by 4 module 306. The rate converter module includes a summer 502, a unit delay element 506 and a downsampling by 2 module 504 which downsamples by a factor of 2 to produce the output of the rate converter module.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In some embodiments various features are implemented using modules. Such modules may be implemented using software, hardware or a combination of software and hardware. Many of the above described methods or method steps can be implemented using machine executable instructions, such as software, included in a computer readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a computer readable medium including computer executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as base stations are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

At least some of the methods and apparatus of various embodiments are applicable to a wide range of communications systems including many OFDM as well as non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A despreading apparatus supporting a plurality of symbol rates, comprising:
a despreading by four assemblies configured to receive a chip stream and to generate a first reduced rate symbol stream therefrom, the first reduced rate symbol stream having a symbol rate which is one fourth the rate of said chip stream;
a first rate converter configured to receive the first reduced rate symbol stream and to generate a second reduced rate symbol stream therefrom, the second reduced rate symbol stream having a symbol rate one eighth that of the chip stream;
a plurality of five additional rate converters coupled together in sequence, a first of the five additional rate converters having an input for receiving the second reduced rate symbol stream, each individual rate converter in the five additional rate converters producing a reduced rate symbol stream having a data rate one half that of an input symbol stream to the individual rate converter; and
wherein said despreading by four assemblies, said first rate converter and said plurality of five additional rate converters, in combination generate a total of seven reduced rate symbol streams.

2. The despreading apparatus of claim 1, wherein said first rate converter includes a summer, unit delay and downsampler for downsampling by two, the summer and unit delay element receiving symbols output by the despreading by four assemblies, said summer having a second input coupled to the output of the unit delay, the downsampler having an input coupled to the output of said summer and producing symbols at one eighth the rate of said chip stream.

3. The despreading module apparatus of claim 1, further comprising:
a plurality of first through seventh multiplexers, a first of the first through seventh multiplexers having as its inputs a dummy value and the output of the fifth additional rate converter, each of the second through seventh multiplexers having as an input, the output of a preceding multiplexer and one of the sixth through first reduced rate symbol streams, respectively.

4. The despreading module apparatus of claim 3, further comprising:
a controllable downsampler coupled to the output of the seventh multiplexer in said first through seventh multiplexers, said controllable downsampler being configured to downsample the symbol stream generated by the seventh multiplexer to a desired symbol rate.

5. The despreading module apparatus of claim 4, further comprising:
a control module configured to determine the desired symbol rate from user data rate information.

6. A despreading apparatus supporting a plurality of symbol rates, comprising:
despreading by four means for receiving a chip stream and for generating a first reduced rate symbol stream therefrom, the first reduced rate symbol stream having a symbol rate which is one fourth the rate of said chip stream;
first rate converter means for receiving the first reduced rate symbol stream and for generating a second reduced rate symbol stream therefrom, the second reduced rate symbol stream having a symbol rate one eighth that of the chip stream;
a plurality of five additional rate converter means, said five additional rate converter means being coupled together in sequence, a first of the five additional rate converter means having an input for receiving the second reduced rate symbol stream, each individual rate converter means in the five additional rate converter means producing a reduced rate symbol stream having a data rate one half that of an input symbol stream to the individual rate converter means; and
wherein said despreading by four means, said first rate converter means and said plurality of five additional rate converter means, in combination generate a total of seven reduced rate symbol streams.

7. The despreading apparatus of claim 6, wherein said first rate converter means include a summer, unit delay and downsampler for downsampling by two, the summer and unit delay element receiving symbols output by the despreading by four means, said summer having a second input coupled to the output of the unit delay, the downsampler having an input coupled to the output of said summer and producing symbols at one eighth the chip stream rate.

8. The despreading apparatus of claim 6, further comprising:
a plurality of first through seventh alternating switching means for multiplexing inputs, the first of the alternating switching means having as its inputs a dummy value and the output of the fifth additional rate converter, each of the second through seventh alternating switching means having as an input, the output of a preceding alternating switching means and one of the sixth through first reduced rate symbol streams, respectively.

9. The despreading apparatus of claim 8, further comprising:
a controllable downsampling means for downsampling the symbol stream generated by the seventh alternating switching means to a desired symbol rate, said controllable downsampling means being coupled to the output of the seventh alternating switching means.

10. The despreading apparatus of claim 9, further comprising:
control means for determining the desired symbol rate from user data rate information.

* * * * *